(12) United States Patent
Mizuno et al.

(10) Patent No.: US 8,909,469 B2
(45) Date of Patent: Dec. 9, 2014

(54) NAVIGATION APPARATUS, NAVIGATION METHOD, AND NAVIGATION PROGRAM

(75) Inventors: Nobuhiro Mizuno, Tokyo (JP); Yasuhiro Shimizu, Kariya (JP)

(73) Assignee: Denso Corporation, Kariya (JP)

( * ) Notice: Subject to any disclaimer, the term of this patent is extended or adjusted under 35 U.S.C. 154(b) by 142 days.

(21) Appl. No.: 13/430,324

(22) Filed: Mar. 26, 2012

(65) Prior Publication Data

US 2012/0310526 A1 Dec. 6, 2012

(30) Foreign Application Priority Data

Jun. 2, 2011 (JP) ................................. 2011-124385

(51) Int. Cl.
G01C 21/34 (2006.01)
G01C 21/26 (2006.01)
G01C 21/36 (2006.01)

(52) U.S. Cl.
CPC .................................. *G01C 21/3617* (2013.01)
USPC ........................ 701/424; 701/533; 340/995.19

(58) Field of Classification Search
None
See application file for complete search history.

(56) References Cited

U.S. PATENT DOCUMENTS

| | | | | |
|---|---|---|---|---|
| 5,878,368 | A * | 3/1999 | DeGraaf ........................ | 701/411 |
| 6,256,579 | B1 | 7/2001 | Tanimoto | |
| 7,610,151 | B2 * | 10/2009 | Letchner et al. .............. | 701/424 |
| 7,702,456 | B2 * | 4/2010 | Singh ............................. | 701/425 |
| 2003/0055558 | A1 * | 3/2003 | Watanabe et al. ............. | 701/208 |
| 2006/0069500 | A1 * | 3/2006 | Hashizume ................... | 701/209 |
| 2007/0005235 | A1 | 1/2007 | Suzuki et al. | |
| 2008/0319658 | A1 | 12/2008 | Horvitz et al. | |
| 2010/0106414 | A1 * | 4/2010 | Whitehead ..................... | 701/213 |
| 2012/0158283 | A1 * | 6/2012 | Arastafar ....................... | 701/410 |

FOREIGN PATENT DOCUMENTS

| | | |
|---|---|---|
| CN | 101246021 A | 8/2008 |
| CN | 101349566 A | 1/2009 |
| CN | 101776458 A | 7/2010 |
| CN | 101799300 A | 8/2010 |
| DE | 10 2006 057153 A1 | 6/2007 |
| JP | 2007-10572 A | 1/2007 |
| JP | 2008-64597 * | 3/2008 |
| WO | 2006027354 A1 | 3/2006 |
| WO | 2007063127 A1 | 6/2007 |
| WO | WO2009/157194 A1 * | 12/2009 |

OTHER PUBLICATIONS

Extended European Search Report for Application No. 12 16 1398 dated Aug. 22, 2014.
Office action for application No. CN 201210084647.8 dated Sep. 12, 2014.

* cited by examiner

*Primary Examiner* — Michael J Zanelli
(74) *Attorney, Agent, or Firm* — Pearne & Gordon LLP

(57) ABSTRACT

To improve accuracy of determining whether route elements stored as a history are route elements familiar to the user, a navigation apparatus 100 includes: a passage history storage unit 9a that stores a history of route elements passed in the past; a memory cost determination unit 84 that determines memory costs indicative of how less likely a user still has in mind the route elements stored in the passage history storage unit 9a based on the history stored in the passage history storage unit 9a; a route search unit 85 that searches for a route leading to a destination by combining the route elements to minimize a route cost of the entire route including the memory costs determined by the memory cost determination unit 84; and a navigation unit 86 that performs a route guide in accordance with the route searched by the route search unit 85.

16 Claims, 7 Drawing Sheets

Fig.3

| USER ID | ROUTE ELEMENT ID | MEMORY COST | PASSAGE DATE/TIME | ACTION ID |
|---------|------------------|-------------|-------------------|-----------|

Fig.7

| USER ID | ROUTE ELEMENT ID | MEMORY COST | PASSAGE DATE/TIME | ACTION ID | WEIGHT |

NAVIGATION APPARATUS, NAVIGATION METHOD, AND NAVIGATION PROGRAM

BACKGROUND OF THE INVENTION

1. Field of the Invention

The present invention relates to a navigation apparatus, a navigation method, and a navigation program, and particularly, to a navigation apparatus, a navigation method, and a navigation program having a stored history of route elements passed in the past.

2. Description of the Related Art

A navigation apparatus is a system for guiding a user through a route from a departure place to a destination to support a travel of the user. The navigation apparatus searches for a route from a current position (departure place) to a destination when the user sets the destination. The navigation apparatus stores, as route elements, information of roads divided at intersections on a map and information of the intersections. In the route search, the navigation apparatus combines the route elements to search for, as a route, a combination with a minimum route cost including distance, average travel time, road width, the number of left and right turns, and the like (however, weights are added according to priorities). A display apparatus of the navigation apparatus displays the searched route, and the route guide is presented according to the route and the current position.

The user may not always need the route guide from the navigation apparatus. For example, the user does not need excessive information from the route guide when the user knows the route leading to the destination well.

A conventional navigation apparatus that selects a simple guide mode and a detailed guide mode in the route guide is known (for example, see Japanese Patent Laid-Open No. 2007-10572). In the conventional navigation apparatus, the simple guide mode for simple route guide takes place when guiding a route familiar to the user and the detailed guide mode for detailed route guide takes place when guiding a route that is not familiar to the user. The navigation apparatus needs to know whether or not the user is familiar with the route elements to be presented for the route guide in order to appropriately change the guide level in the route guide.

If more than one combination of the route elements exist from a departure place to a destination in the route search, the conventional navigation apparatus searches for a route so as to pass through more route elements familiar to the user than other routes. Also in this regard, the navigation apparatus needs to know whether or not the user is familiar with the route elements in the searched route.

The conventional navigation apparatus considers a route element through which the user has passed for more than a predetermined number of times in the past to be a regular route element, or a route element familiar to the user.

However, since determination as to whether the user is familiar with the route element is made based only on the number of passages, a route element that the user scarcely passes now while the user was used to frequently pass in a certain period in the past and thus may not be familiar to the user (who has forgotten) may be recognized as a route element familiar to the user.

The present invention has been made to solve the problem, and an object of the present invention is to improve accuracy of determination as to whether route elements stored as a history are familiar to the user, with a navigation apparatus that stores the history of the route elements passed in the past.

SUMMARY OF THE INVENTION

The present invention provides a navigation apparatus including: a passage history storage unit that stores a history of route elements passed in the past; a memory cost determination unit that determines memory costs indicative of how less likely a user still has in mind the route elements stored in the passage history storage unit based on the history stored in the passage history storage unit; a route search unit that searches for a route leading to a destination by combining the route elements to minimize a route cost of the entire route including the memory costs determined by the memory cost determination unit; and a navigation unit that performs a route guide in accordance with the route searched by the route search unit.

According to the above navigation apparatus, the memory costs of the route elements are determined based on the history stored in the passage history storage unit. The memory costs are values indicative of possibility that the user does not have in mind the route elements. For example, if the user has passed through a route element for a number of times in the past but does not recently pass through the route element at all, the memory cost determination unit may determine the memory cost to be high, because the user is less likely to have in mind the route element. If the user has passed through the route element only few times but has passed through the route element most recently, the memory cost determination unit may determine the memory cost to be low, because the possibility that the user has in mind the route element is high. The route search unit searches for the route by combining the route elements based on the possibility that the user does not have in mind the route elements. Therefore, the route search can be suitably performed in the case where the route elements remembered by the user are prioritized to search for the route.

In the navigation apparatus, the navigation unit may perform the route guide in different guide levels based on the memory costs of the route elements included in the route searched by the route search unit.

According to the above navigation apparatus, the navigation unit can perform the route guide in different guide levels based on the possibility that the user does not have in mind the route elements to be passed. The navigation unit can appropriately change the guide level according to the possibility that the user does not have in mind the route elements to be passed, such as by setting a simple guide for the route elements remembered by the user.

The navigation apparatus may further include a memory cost storage unit that stores the memory costs of the route elements stored in the passage history storage unit, the memory costs determined by the memory cost determination unit, wherein the route search unit may refer to the memory costs stored in the memory cost storage unit to calculate the route cost for the route elements included in a plurality of possible routes to the destination.

According to the above navigation apparatus, the navigation apparatus stores in advance the memory costs of the route elements stored in the passage history storage unit. Therefore, the navigation apparatus does not have to determine the memory costs of the route elements every time the route cost including the memory costs is calculated for a plurality of possible routes, and the route search can be speeded up. The navigation apparatus may update the memory cost of the memory cost storage unit every time the route element is passed.

Another aspect of the present invention is to provide a navigation apparatus including: a passage history storage unit that stores a history of route elements passed in the past; a memory cost determination unit that determines memory costs indicative of how less likely a user still has in mind the route elements stored in the passage history storage unit based on the history stored in the passage history storage unit; a route search unit that searches for a route leading to a destination; and a navigation unit that performs a route guide in accordance with the route searched by the route search unit, wherein the navigation unit performs the route guide in different guide levels based on the memory costs of the route elements included in the route searched by the route search unit.

According to the above navigation apparatus, the navigation unit can perform the route guide in different guide levels based on the possibility that the user does not have in mind the route elements to be passed. The navigation unit can appropriately change the guide level according to the possibility that the user does not have in mind the route elements to be passed, such as by setting a simple guide for the route elements remembered by the user.

In the navigation apparatus, the history of the route elements stored in the passage history storage unit may include information of date, and the memory cost determination unit may take the information of date into account to determine the memory costs.

According to the above navigation apparatus, the information of date in the history can be used to suitably determine the memory costs. Since the information of date is included in the history, the memory cost determination unit can sort the history in the order of the date to refer to only the history of most recent certain number of actions and can sort the history in the order of the date to know the number of actions after the last passage through a route element or a period to the present. The history may further include information of time in addition to the information of date.

In the navigation apparatus, the memory cost may be determined based on: (a) a rate of passage through the route element in a most recent certain number of actions; (a') a rate of passage through the route element in actions in a most recent certain period; (b) the number of actions after the last passage through the route element; (b') a period to the last passage through the route element; or a combination of (a) or (a') and (b) or (b').

According to the above navigation apparatus, even if the number of passages through the route element is not large, the memory cost can be decreased when the possibility that the user has in mind the route element well is high. Even if the number of passages through the route element is large, the memory cost can be heightened when the user is less likely to have in mind the route element.

In the navigation apparatus, a weight may be provided to the history of the route elements stored in the passage history storage unit, and the memory cost determination unit may take the weight into account to determine the memory cost.

According to the above navigation apparatus, when a route element is passed, the weight is added according to various conditions, and the history is stored. The memory cost determination unit takes the weight into account to determine the memory cost. Therefore, the route elements with high possibility that the user has in mind can be more accurately figured out to determine the memory costs.

In the navigation apparatus, the weight may be provided according to whether the route element is based on the passage that follows the route guide by the navigation unit.

If the user passes through a route element without the route guide by the navigation unit, the user can easily remember the route element. Therefore, according to the above navigation apparatus, the route elements with high possibility that the user has in mind can be more accurately figured out.

In the navigation apparatus, the weight may be provided based on a length of the route element.

If a route element (road) is long, the user can easily remember the route element. Therefore, according to the above navigation apparatus, the route elements with high possibility that the user has in mind can be more accurately figured out.

In the navigation apparatus, the weight may be provided based on presence or absence of a landmark near the route element.

If there is a landmark in the route element, the user can easily remember the route element in association with the landmark. Therefore, according to the above navigation apparatus, the route elements with high possibility that the user has in mind can be more accurately figured out.

Another aspect of the present invention provides a navigation method including: a passage history storage step of storing a history of route elements passed in the past; a memory cost determination step of determining memory costs indicative of how less likely a user still has in mind the route elements stored in the passage history storage step based on the history stored in the passage history storage step; a route search step of searching for a route leading to a destination by selecting the route elements to minimize a route cost of the entire route including the memory costs determined in the memory cost determination step; and a navigation step of performing a route guide in accordance with the route searched in the route search step.

According to the above navigation method, the memory costs of the route elements are determined based on the stored history. In the route search step, the route elements are combined based on the possibility that the user does not have in mind the route elements to search for the route. Therefore, when the route elements remembered by the user are prioritized to search for the route, the route search can be suitably performed.

Another aspect of the present invention provides a navigation method including: a passage history storage step of storing a history of route elements passed in the past; a memory cost determination step of determining memory costs indicative of how less likely a user still has in mind the route elements stored in the passage history storage step based on the history stored in the passage history storage step; a route search step of searching for a route leading to a destination; and a navigation step of performing a route guide in accordance with the route searched in the route search step, wherein in the navigation step, the route guide is performed in different guide levels based on the memory costs of the route elements included in the route searched in the route search step.

According to the configuration, the route guide can be performed in different guide levels based on the possibility that the user does not have in mind the route elements to be passed. The guide level can be appropriately changed such as by setting a simple guide for the route elements remembered by the user.

Another aspect of the present invention provides a navigation program causing a computer to execute: a passage history storage step of storing a history of route elements passed in the past; a memory cost determination step of determining memory costs indicative of how less likely a user still has in mind the route elements stored in the passage history storage step based on the history stored in the passage history storage step; a route search step of searching for a route leading to a destination by selecting the route elements to minimize a route cost of the entire route including the memory costs determined in the memory cost determination step; and a navigation step of performing a route guide in accordance with the route searched in the route search step.

According to the above navigation method, the memory costs of the route elements are determined based on the stored history. In the route search step, the route elements are combined based on the possibility that the user has in mind the route elements to search for the route. Therefore, when the route elements remembered by the user are prioritized to search for the route, the route search can be suitably performed.

Another aspect of the present invention is to provide a navigation program causing a computer to execute: a passage history storage step of storing a history of route elements passed in the past; a memory cost determination step of determining memory costs indicative of how less likely a user still has in mind the route elements stored in the passage history storage step based on the history stored in the passage history storage step; a route search step of searching for a route leading to a destination; and a navigation step of performing a route guide in different guide levels in accordance with the route searched in the route search step and based on the memory costs of the route elements included in the route searched in the route search step.

According to the above navigation program, the route guide can be performed in different guide levels based on the possibility that the user has in mind the route elements to be passed. The guide level can be appropriately changed such as by setting a simple guide for the route elements remembered by the user.

According to the present invention, the memory costs indicative of how less likely the user still has in mind the route elements are determined based on the stored history. Therefore, the route elements familiar to the user can be more accurately figured out, compared to a case where the memory costs are simply determined in accordance with the number of passages through the route elements.

BRIEF DESCRIPTION OF THE DRAWINGS

FIG. 3 is a diagram showing a data structure of a history of route elements according to the embodiment of the present invention;

FIG. 7 is a diagram showing a data structure of a history of route elements according to a modified example of the embodiment of the present invention.

DETAILED DESCRIPTION OF THE PREFERRED EMBODIMENT

Figure 1:
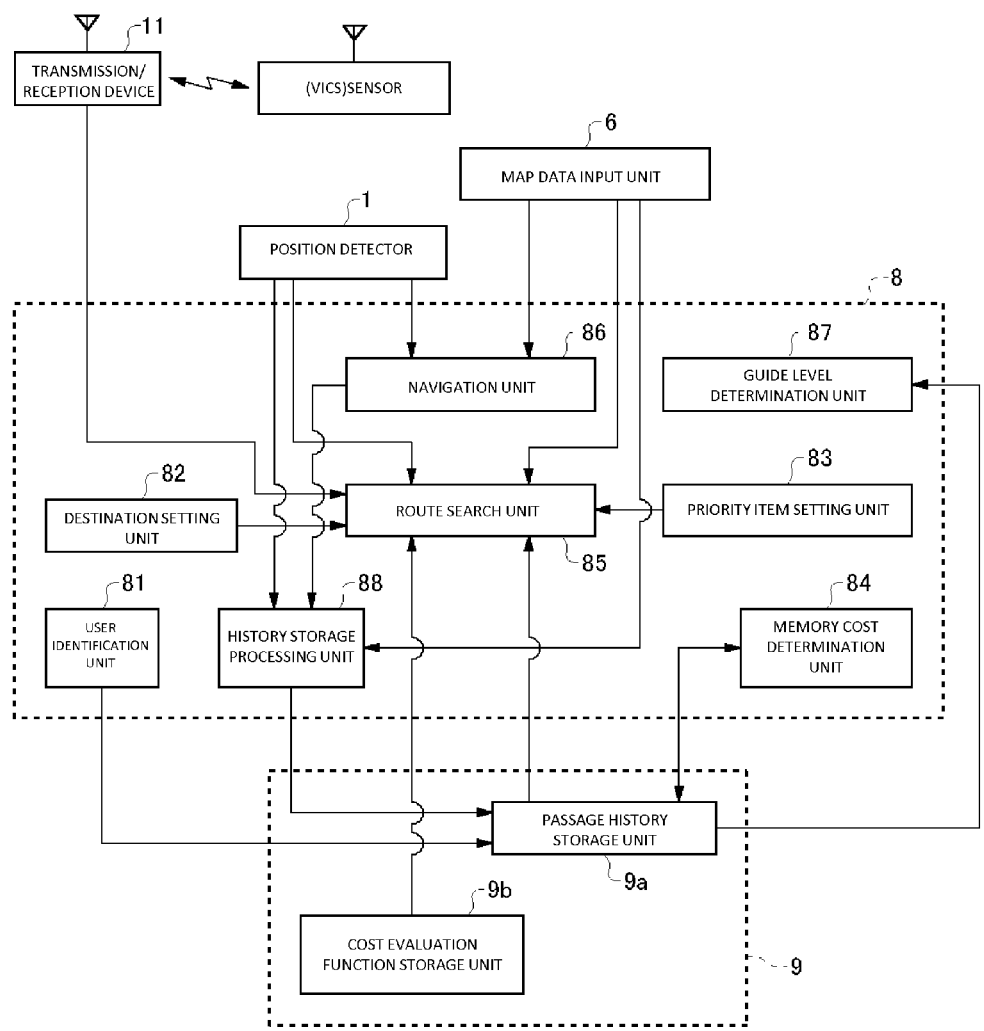
FIG. 1 is a block diagram showing a configuration of main parts of a navigation apparatus according to an embodiment of the present invention.
Figure 2:
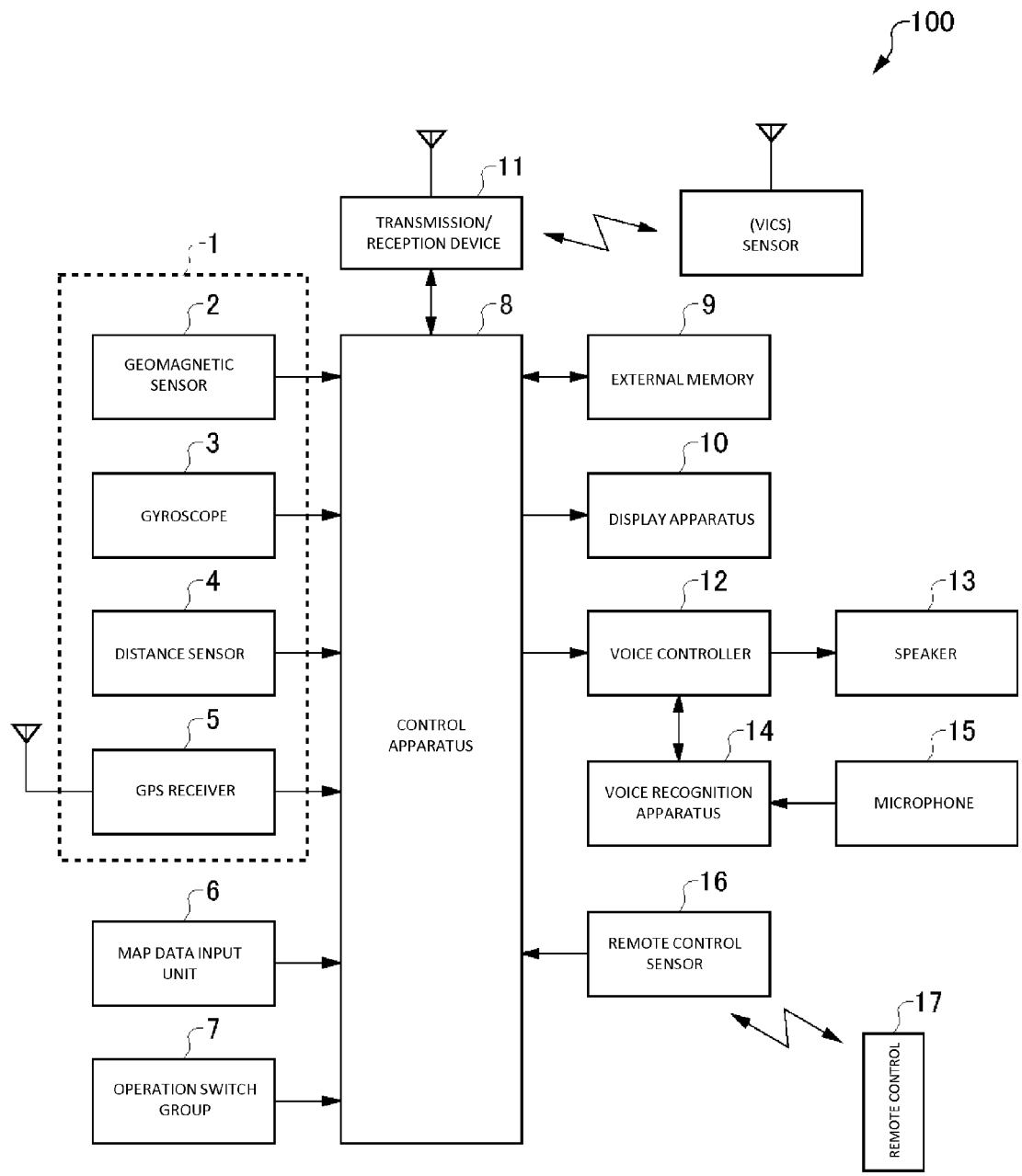
FIG. 2 is a block diagram showing a configuration of the navigation apparatus according to the embodiment of the present invention.

A navigation apparatus of an embodiment of the present invention will now be described with reference to the drawings. FIG. 1 is a block diagram showing a configuration of main parts of the navigation apparatus according to the embodiment of the present invention. FIG. 2 is a block diagram showing a configuration of the navigation apparatus according to the embodiment of the present invention. An entire configuration of a navigation apparatus 100 according to the present embodiment will be described first with reference to FIG. 2.

Part of the configuration of the navigation apparatus 100 also functions as a route search apparatus. As shown in FIG. 2, the navigation apparatus 100 includes a position detector 1, a map data input unit 6, an operation switch group 7, an external memory 9, a display apparatus 10, a transmission/reception device 11, a voice controller 12, a speaker 13, a voice recognition apparatus 14, a microphone 15, a remote control sensor 16, a remote control terminal (hereinafter, called "remote control") 17, and a control apparatus 8 connected with the apparatuses.

The position detector 1 includes a geomagnetic sensor 2 that detects an absolute bearing of a vehicle, a gyroscope 3 that detects a relative bearing of the vehicle, a distance sensor 4 that detects a travel distance of the vehicle, and a GPS receiver 5 for a global positioning system (GPS) that measures the position of the vehicle based on a radio wave from a satellite. The sensors and the like 2, 3, 4, and 5 are all known. The sensors and the like 2, 3, 4, and 5 have errors of different properties. Therefore, the plurality of sensors and the like 2, 3, 4, and 5 complement each other in use. Part of the sensors and the like 2, 3, 4, and 5 may form the position detector 1 depending on the accuracy. A rotation sensor of steering, speed sensors of rolling wheels, and the like not shown may also be used.

The map data input unit 6 includes a storage medium not shown, such as a DVD-ROM, a CD-ROM, a flash memory, and a hard disk. The storage medium stores digital map data including road data, background data, character data, facility data, etc. The road data is stored for each route element. The route elements include information of intersections (nodes) and roads (links) connecting the intersections. A route element ID is provided to each route element. The map data input unit 6 inputs the data to the control apparatus 8.

The operation switch group 7 includes a touch panel integral with the display apparatus 10 and is used for various inputs for changing the scale of a map displayed on the display apparatus 10, selecting a menu display, setting a destination, searching for a route, starting a route guide, correcting a current position, changing a display screen, and adjusting the volume. Part or all of the switches in the operation switch group 7 may be mechanical switches arranged around the display apparatus 10.

The remote control 17 includes a plurality of operation switches not shown, and input operations similar to the operation switch group 7 can be performed by operating the operation switches. A signal indicative of the input operation input to the remote control 17 is supplied to the control apparatus 8 through the remote control sensor 16.

The external memory 9 is, for example, a memory card or a hard disk and includes a writable storage medium. The external memory 9 stores various data such as a home position set by the user, text data, image data, and voice data.

The display apparatus 10 includes, for example, a liquid crystal display or an organic EL display. In a predetermined map display area of the display apparatus 10, a vehicle position mark corresponding to the current position of the vehicle is superimposed and displayed on the road map around the vehicle generated by the map data. The display apparatus 10 can additionally display other information such as the current time and congestion information.

The transmission/reception device 11 is a communication device for communicating and connecting with the outside. The transmission/reception device 11 is connected to a VICS (Vehicle Information and Communication System) sensor that receives road traffic information (including traffic jam information and traffic control information), weather information, date information, day information, facility information, and advertisement information provided from a VICS center through a beacon installed on the road or through an FM broadcast station of a local area. The transmission/reception device 11 transmits the road traffic information, etc., to the control apparatus 8. The transmission/reception device 11 can also output information processed by the control apparatus 8. The transmission/reception device 11 may be connected to the Internet to receive the road traffic information, etc., through the Internet.

The speaker 13 outputs a predetermined voice (such as voice for guidance, description of screen operation, and result of voice recognition) to the outside based on a voice output signal input from the voice controller 12.

The microphone 15 inputs, as an electrical signal, a voice generated by the operator to the voice recognition apparatus 14. The voice recognition apparatus 14 compares the input voice of the operator input from the microphone 15 with vocabulary data (comparison pattern) in a recognition dictionary (not shown) stored inside. The voice recognition apparatus 14 inputs, as a recognition result, data with the highest degree of coincidence to the voice controller 12.

The voice controller 12 controls the voice recognition apparatus 14, and through the speaker 13, controls a talk-back output (voice output) to the operator who has input the voice. The voice controller 12 also executes a process of inputting the recognition result of the voice recognition apparatus 14 to the control apparatus 8.

The control apparatus 8 is a normal computer and includes known CPU, ROM, RAM, and I/O as well as a bus line for connecting the configurations. Programs executed by the control apparatus 8 are written in the ROM, and a CPU and the like execute predetermined arithmetic processing according to the programs.

Based on information from the voice recognition apparatus 14, the control apparatus 8 executes a predetermined process in response to generation of voice by the operator and a predetermined process in response to an input operation of the operation switch group 7 or the remote control 17 (for example, a process of storing map data in the external memory 9, a map scale changing process, a menu display selection process, a destination setting process, a route search execution process, a route guide process, a current position correction process, a display screen changing process, and a volume adjustment process). The speaker 13 appropriately outputs the route guide voice information, etc., processed by the control apparatus 8 through the voice controller 12.

FIG. 1 is a block diagram showing a configuration of main parts of the navigation apparatus 100 according to the embodiment of the present invention. The external memory 9 includes a passage history storage unit 9a and a cost evaluation function storage unit 9b.

The passage history storage unit 9a stores a history of route elements passed in the past. A history storage processing unit 88 described later stores the history of the passed route elements in the passage history storage unit 9a. FIG. 3 is a diagram showing a data configuration of the history of the route elements. As illustrated in FIG. 3, the passage history storage unit 9a stores, for each passage of a route element, a user ID of the user who has passed the route element, a route element ID of the passed route element, a memory cost, a passage date/time, and an action ID. In the passage history storage unit 9a, a section that stores the memory cost associated with the user ID and the route element ID corresponds to a memory cost storage unit of the present invention. Instead of in the passage history storage unit 9a, the memory cost may be stored, user by user, in another area along with the route element ID. The storage area may serve as the memory cost storage unit of the present invention.

A memory cost determination unit 84 determines and stores the memory cost. A determination method of the memory cost will be described later. The "action" of the action ID denotes a travel from a departure place to a destination. If the user moves from a departure place to a destination through a plurality of route elements, the same action ID is provided to the route elements passed in the course of the travel.

The cost evaluation function storage unit 9b is an area that stores a cost evaluation function Ci shown in the following Expression (1) used for the route search from the current position of the vehicle to the destination.

$$Ci = \alpha * l(i) + \beta * t(i) + \gamma * w(i) + \delta * n(i) + \epsilon * m(i) \quad (1)$$

In Expression (1), l(i) denotes a cost of a distance, t(i) denotes a cost of an average travel time, w(i) denotes a cost of a road width, n(i) denotes a cost of the number of left and right turns, and m(i) denotes a memory cost. The factors $\alpha$, $\beta$, $\gamma$, $\delta$, and $\epsilon$ are weighting factors that change according to priority items set by a priority item setting unit 83 described later.

The memory cost m(i) is a value that decreases with an increase in the possibility that the user has in mind the route element. The cost evaluation function Ci shown in Expression (1) is an example, and the cost evaluation function Ci may include parameters other than the distance, the average travel time, the road width, the number of left and right turns (for example, a speed limit and the number of signals).

The control apparatus 8 includes a user identification unit 81, a destination setting unit 82, the priority item setting unit 83, the memory cost determination unit 84, a route search unit 85, a navigation unit 86, a guide level determination unit 87, and the history storage processing unit 88.

The user identification unit 81 identifies who the driver is. The user identification unit 81 displays a list of a plurality of users registered in advance on the display apparatus 10 and identifies, from the list displayed on the display apparatus 10, the user by receiving a selection from the driver through an operation of the operation switch group 7 or the remote control 17.

The destination setting unit 82 sets a destination that is subject to the route search and the route guide. The user operates the operation switch group 7 or the remote control 17 to set the destination. The destination setting unit 82 may set the destination by automatically estimating the destination based on user information, such as age of the user, and status information, such as date and time.

The priority item setting unit 83 sets priority items when the route search unit 85 searches for the route. The user operates the operation switch group 7 or the remote control 17 to set the priority items. The priority items include distance, time, general road, and road width and further includes memory specific to the present embodiment.

The memory cost determination unit 84 determines the memory cost of each route element stored in the passage history storage unit 9a. The memory cost denotes a value indicative of how less likely the user still has in mind the route element. The lower the possibility that the user has in mind the route element, the higher the value. The memory cost determination unit 84 determines the memory cost based on the history of each user stored in the passage history storage unit 9a.

The memory cost determination unit 84 determines, as a memory cost, a cost corresponding to the possibility that the user has in mind the route element based not simply on the number of passages through the route element in the past on the basis of the history, but also on the date/time (may only be the date) of the passage through the route element included in the history. Specifically, in the present embodiment, the memory cost may be determined based on (a) a rate of the passage through the route element in a most recent certain number of actions, (b) the number of actions after the last passage through the route element, (a') a rate of the passage through the route element in actions in a most recent certain period, or (b') a period to the last passage through the route element.

The memory cost may be a continuous value or may be a discrete value. For example, a value subtracting the rate of the passage through the route element in a most recent certain number of actions from 100% may serve as the memory cost in (a). Alternatively, the memory cost in (a) may be set to 2, 1, and 0 when the rate of the passage through the route element in the most recent certain number of actions is 0%, 0 to 50%, and 50 to 100%, respectively.

The case (a) is based on a notion that the memory cost of the route element actually passed through on a daily basis is lowered. For example, the number of passages through a route element habitually passed once a year is increased by storing the history of the route element for several years, and the rate of the passage through the route element in the entire history may increase. It is not proper to handle the route element as a route element that the user remembers well.

Therefore, in (a), the memory cost is determined based on the rate of the passage through the route element in a most recent certain number of actions. For example, assuming that actions of one round trip are performed every day (two actions every day), a route element that is passed at a rate of once or more per two weeks in most recent one month (the number of actions is 60) can be set as a route element that the user remembers well (memory cost: 1). A route element that is passed at a rate of once or more per two days can be set as a route element that the user remembers further well (memory cost: 0). In this case, the memory cost can be set to 2 if the rate of the passage in the most recent 60 actions is 0% or more and less than 4%. The memory cost can be set to 1 if the rate is 4% or more and less than 25%, and the memory cost can be set to 0 if the rate is 25% or more.

The case (b) is based on a notion that the memory cost of a route element fresh in memory is lowered. More specifically, even if the user has passed through the route element only once before, the route element is currently fresh in memory if the user has most recently passed through the route element, and the possibility that the user has in mind the route element is high. On the other hand, for example, the user may not currently remember the route element that the user has often passed through several years ago but has not recently passed through at all, although the rate of the passage through the route element may be high in the entire travel history.

Therefore, in (b), the memory cost is determined based the number of actions after the last passage through the route element. For example, assuming that actions of one round trip are performed every day as described above (two actions every day), the memory cost can be set to 0 if the number of actions between the last passage to the present is less than three. The memory cost can be set to 1 if the number of actions is three or more and less than fourteen, and the memory cost can be set to 2 if the number of actions is fourteen or more.

The number of actions in (a) and (b) is replaced by the period in (a') and (b'). The memory cost may be determined by appropriately combining (a) or (a') and (b) or (b'). For example, even if the rate (a) of the passage in a most recent certain number of actions is relatively small, a combination of (a) and (b') enables to determine that the user remembers the route element well if the period (b') to the last passage is short. If the rate (a) of the passage in a most recent certain number of actions is large, the combination enables flexible handling of determining that the user remembers the route element well even if the period (b') to the last passage is relatively long.

The certain number of times in (a) and the certain period in (a') may be adjusted in accordance with the action frequency of the user. More specifically, if the action frequency of the user is high, the certain number of times in (a) may be increased, or the certain period in (a') may be reduced. If the action frequency of the user is low, the certain number of times in (a) may be reduced, or the certain period in (a') may be increased.

Figure 4:
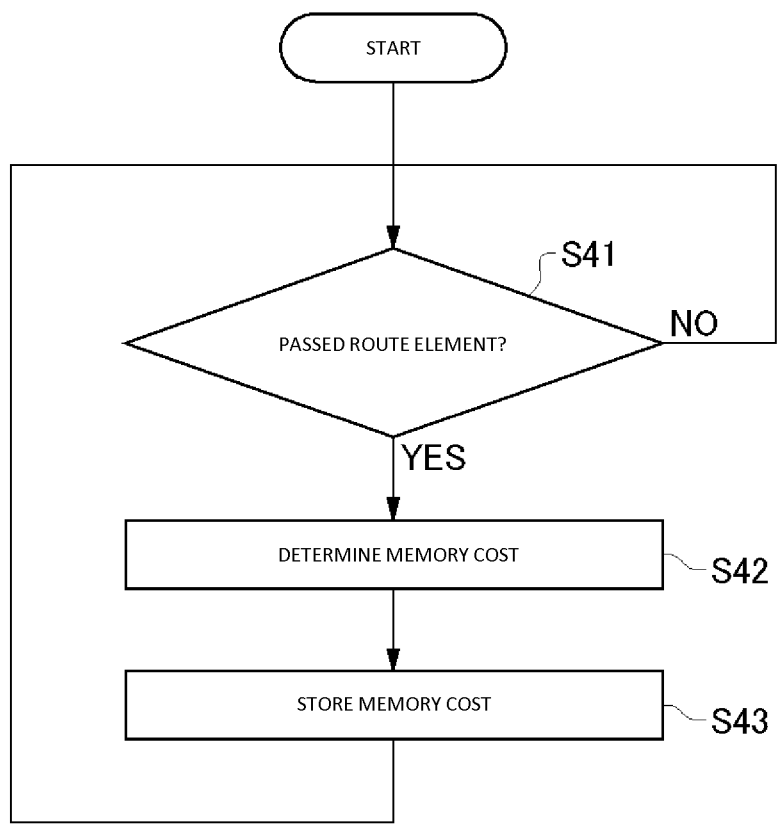
FIG. 4 is a flow chart of determining a memory cost according to the embodiment of the invention.

FIG. 4 is a flow chart of a memory cost determination process by the memory cost determination unit 84. The memory cost determination unit 84 monitors whether the user has passed through a route element (step S41), and if the user has passed through the route element (YES in step S41), the history storage processing unit 88 adds the history to the passage history storage unit 9a. Therefore, the memory cost determination unit 84 determines the memory cost of each route element stored in the passage history storage unit 9a based on the history including the route element (step S42) and stores the determined memory cost in the passage history storage unit 9a (step S43). The memory cost determination unit 84 returns to step S41 and again monitors whether the user has passed through a route element.

Based on the map data input from the map data input unit 6, the route search unit 85 searches for a route from the current position (departure place) of the vehicle detected by the position detector 1 to the destination set by the destination setting unit 82. The route search unit 85 combines the route elements stored in the map data input unit 6 to search for the route.

The route search unit 85 uses the cost evaluation function $C_i$ shown in Expression (1) stored in the cost evaluation function storage unit 9c to search for a route that minimizes the value of the cost evaluation function $C_i$ (route cost) shown in Expression (1) based on a known method such as a Dijkstra method. The factors $\alpha$, $\beta$, $\gamma$, $\delta$, and $\epsilon$ in the cost evaluation function $C_i$ shown in Expression (1) are determined according to the priority items set by the priority item setting unit 83. The memory cost $m(i)$ is stored in the passage history storage unit 9a, and the route search unit 85 refers to the memory cost $m(i)$ to calculate the route cost.

The route search unit 85 acquires the road traffic information including the traffic jam information and the traffic control information from the transmission/reception device 11, and if there are the traffic jam information and the traffic control information, takes the information into account to search for an optimal route. Specifically, if there is a traffic jam or a traffic control, the route search unit 85 searches for an optimal route to avoid the traffic jam or the traffic control. If there is related information concerning the searched route, the display apparatus 10 displays the related information, or the speaker 13 outputs the related information by voice. For example, if there is event information of a facility in the middle of the route, the information is provided to the user at appropriate timing. In this case, the display apparatus 10 and the speaker 13 correspond to a related information presenting unit.

Figure 5:
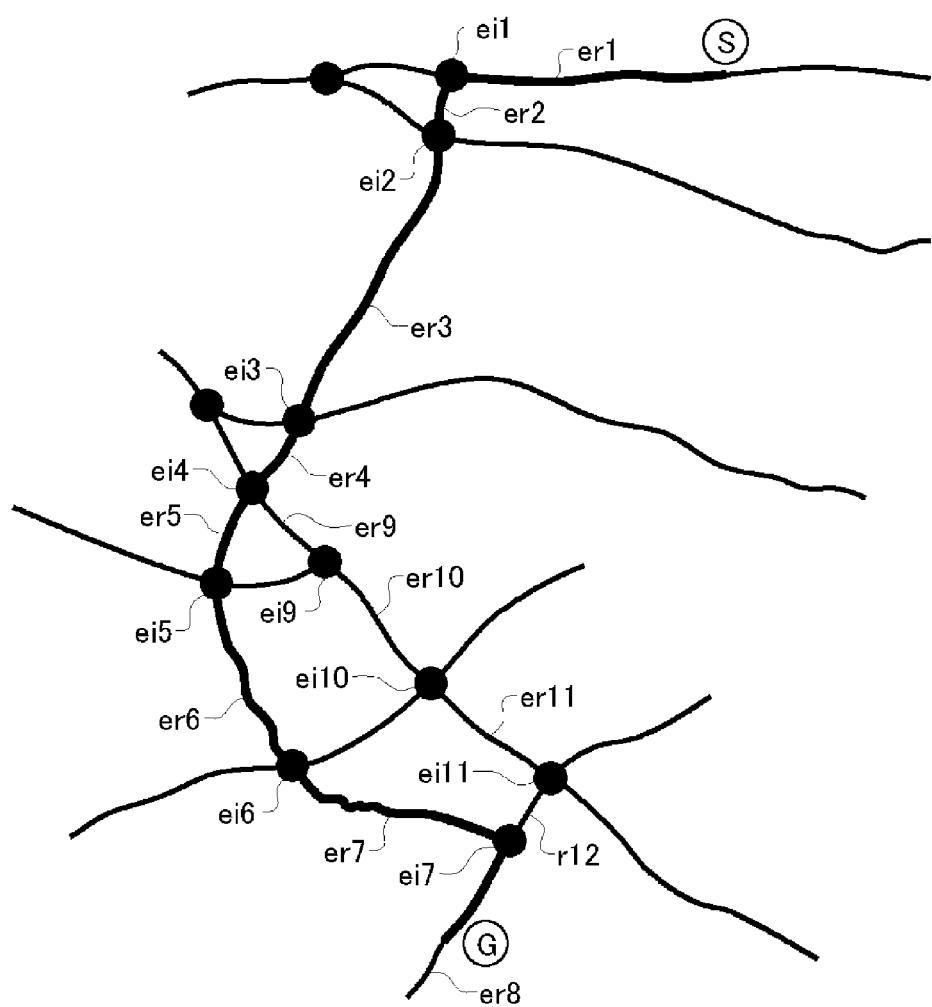
FIG. 5 is a diagram showing an example of route search according to the embodiment of the present invention.

FIG. 5 is a diagram showing an example of the route search. In FIG. 5, among the route elements, intersections (nodes) are indicated by black circles, and roads (links) are indicated by line segments connecting the intersections. FIG. 5 illustrates an example of searching for a route from a departure place S to a destination G. In the example, it is assumed that the memory costs of the route elements ei4, er5, ei5, er6, ei6, er7, ei7, and er8 are low (possibility of the user remembering well is high).

If the distance is prioritized, the route search unit 85 searches for a route that passes through a link er1, a node ei1, a link erg, a node ei2, a link er3, a node ei3, and a link er4 from the departure place S, turns left at the node ei4, and reaches the destination G through a link erg, a node ei9, a link er10, a node ei10, a link er11, a node ei11, a link er12, the node ei7, and the link er8. Meanwhile, if the memory is prioritized, the route search unit 85 searches for a route that reaches the destination G from the node ei4 through the link er5, the node ei5, the link er6, the node ei6, the link er7, the node ei7, and the link er8 with low memory costs.

The navigation unit 86 executes the route guide based on the route searched by the route search unit 85, the current position of the vehicle sequentially detected by the position detector 1, and the map data from the map data input unit 6.

The navigation unit 86 changes the guide level of the route guide according to the guide level output from the guide level determination unit 87. More specifically, if the route element to be guided is a route element with a low memory cost (possibility of the user remembering well is high), the navigation unit 86 lowers the guide level to provide simple guide information. On the other hand, if the route element to be guided is a route element with a high memory cost (possibility of the user remembering well is low), the navigation unit 86 increases the guide level to provide detailed guide information. For example, "300 m ahead, turn left at intersection A with a gas station at the corner." is guided in the detailed guide information, while "Turn left at intersection A ahead." is guided in the simple guide information.

The guide level determination unit 87 determines the guide level based on the memory cost of each route element stored in the passage history storage unit 9a and outputs the guide level to the navigation unit 86. The guide level determination unit 87 increases the guide level for a route element with a high memory cost (possibility that the user has in mind is low) and lowers the guide level for a route element with a low memory cost (possibility that the user has in mind is high).

Figure 6:
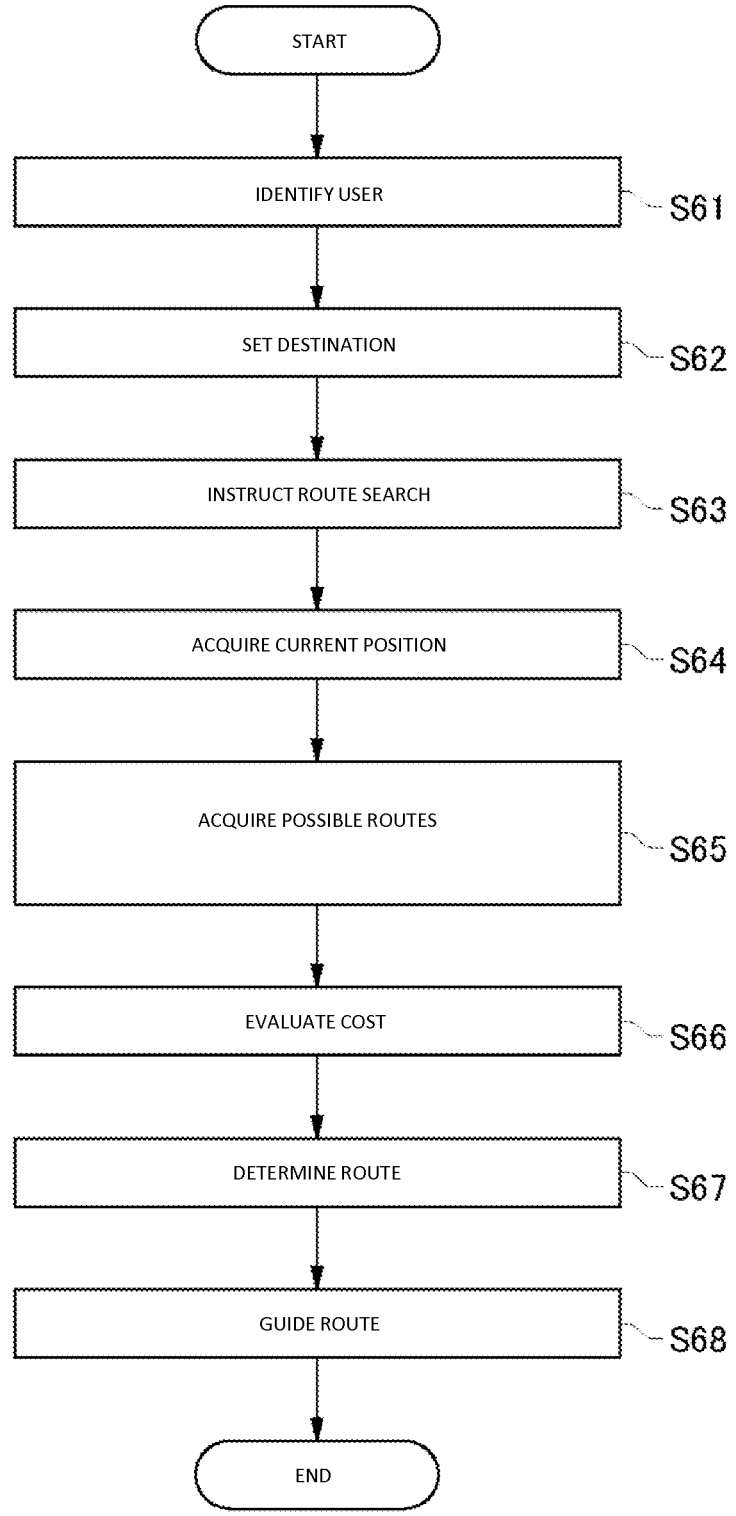
FIG. 6 is a flow chart of the route search according to the embodiment of the present invention.

FIG. 6 is a flow chart of a route search and a process of executing the route search. The user identification unit 81 first identifies the user (step S61). The destination setting unit 82 sets the destination (step S62). The route search is instructed for the route search unit 85 (step S63). The route search unit 85 acquires the current position (departure place) from the position detector 1 (step S64).

The route search unit 85 acquires a plurality of possible routes (step S65) and uses the cost evaluation function Ci with parameters corresponding to the priority items set by the priority item setting unit 83 to calculate the route cost of each possible route (step S66). In this case, the memory costs m(i) of the route elements included in the possible routes are acquired from the passage history storage unit 9a, the memory costs m(i) corresponding to the user identified in step S61.

The route search unit 85 determines the route with the lowest route cost as a search route (step S67). Once the route is determined, the navigation unit 86 performs the navigation (step S68). In this case, the navigation unit 86 changes the guide level for the route element based on the memory cost of the guided route element.

The history storage processing unit 88 stores actually passed route elements as a history in the passage history storage unit 9a based on the information of the current position from the position detector 1 and based on the map data from the map data input unit 6. The history of the route elements stored in the passage history storage unit 9a is as described in FIG. 3. The history storage processing unit 88 stores the passed route elements in the passage history storage unit 9a regardless of whether the navigation unit 86 performs the route guide.

As described, according to the navigation apparatus 100 of the present embodiment, the memory cost determination unit 84 determines, for each route element, the memory cost indicative of whether the possibility that the user has in mind is high based on the history, instead of simply determining whether the user knows the route elements well based on the number of passages in the past. Therefore, for example, whether the user actually knows the route elements well can be more suitably determined by increasing the memory cost (reducing the possibility of remembering) of the route element that the user has not recently passed through, even though the number of passages is large, and by lowering the memory cost (increasing the possibility of remembering) of the route element that the user has most recently passed through, even though the number of passages is small.

As a result, if the route elements that the user knows are prioritized in the route search, such a route search can be suitably performed. If the guide level of the route guide is lowered for the route elements that the user knows, a change in such a guide level can be more suitably performed.

Various modifications are possible for the embodiment. For example, although the navigation apparatus 100 of the embodiment has the function of performing the route search in consideration of the memory costs and the function of performing the route guide in different guide levels according to the memory costs, the navigation apparatus 100 may have only one of the functions.

Although the directions of the passages are not identified for the route elements in the embodiment, the route elements may be stored in the passage history storage unit 9a on the basis of the directions of the passages, and the memory costs may also be determined and stored on the basis of the directions of the passages. More specifically, the memory cost may be determined for each direction of the passage for the road (link), and the memory cost may be determined for each direction of the entry or for each combination of the direction of the entry and the direction of the exit for the intersection (node).

In the embodiment, the memory cost determination unit 84 determines the memory cost every time the route element is passed. However, the memory cost determination unit 84 may monitor whether one action (i.e. travel from the departure place to the destination) is finished and may determine, upon the arrival at the destination, the memory costs of the route elements stored in the passage history storage unit 9a based on the history including the route elements passed in the action.

Instead of calculating the storing costs of all route elements stored in advance in the passage history storage unit 9a and storing the memory costs in the passage history storage unit 9a, the memory cost determination unit 84 may determine the memory cost of the route element on an as needed basis during the search for the route by the route search unit 85. More specifically, the determined memory cost may not be stored in the passage history storage unit 9a.

Although a plurality of memory costs are illustrated in the embodiment, the memory costs are not limited to the ones illustrated above. The memory costs may be other memory costs as long as the memory costs are determined based on the past history, and the memory costs indicate the possibility that the user has in mind the route elements stored in the passage history storage unit. For example, the memory cost may be determined based on the proportion of the route element among all route elements stored in the passage history storage unit 9a. In this case, the larger the proportion, the lower the memory cost. For example, the memory costs when the proportion is 0%, less than 10%, and 10% or more may be 2, 1, and 0, respectively. For example, the memory cost may be determined based on the number of route elements among all route elements stored in the passage history storage unit 9a. In this case, the larger the number, the lower the memory cost. For example, the memory costs when the number is 0, less than 3, 3 or more may be 2, 1, and 0, respectively.

In the embodiment, a list of a plurality of users registered in advance is displayed on the display apparatus 10, and the user identification unit 81 makes the driver select the user from the list to identify the user. However, if the seat is electric and if there is a memory function for storing the seat position, and the seat position is stored for each user, the user identification unit 81 may identify the user in conjunction with the use of the memory function.

Although only the route elements that are actually passed are stored as a history in the embodiment, a history of route elements around the route elements that are actually passed may also be stored.

A history of the destination may also be stored to determine the memory cost to perform the route guide using spots remembered well. For example, if the user remembers well "XYZ department store", a route guide "Turn left at the intersection ahead in the direction of XYZ department store." may be displayed instead of a route guide "Turn left at the intersection ahead."

The history storage processing unit 88 may weight the history in accordance with various conditions and store the history when storing the history of a route element in the passage history storage unit 9a every time the route element is passed.

FIG. 7 is a diagram showing a data structure of the history of route elements when the history is weighted. The history of the route elements includes, for each passage through the route element, data of the weight in addition to the user ID of the user who has passed through the route element, the route element ID of the passed route element, the memory cost, the passage date/time, and the action ID. More specifically, in the embodiment described with reference to FIG. 3, all records of the history of the route elements have the same weight, which is one time of passage. In the modified example, the records have different weights according to various situations, such as 1.5 times of passage and 0.5 times of passage. The weights are provided by the history storage processing unit 88 and stored in the passage history storage unit 9a. The weights are provided according to, for example, whether the passage is in accordance with the route guide by the navigation unit 86, the length of the route element (road), and the presence or absence of a landmark. A specific example will be described.

When passing through a route element, the history storage processing unit 88 sets the weight to 1 if the passage is a passage that follows the route guide by the navigation unit 86 and sets the weight to 10 if the route element is passed without the route guide by the navigation unit 86. More specifically, the passage that follows the navigation is counted as one passage, and the passage that is not based on the route guide by the navigation unit 86 is counted as ten passages. This is because if the user passes through the route element without the route guide by the navigation unit 86, the user is deeply impressed by the route element, and the possibility that the user has in mind the route element is high. In this case, the memory may be surely fixed, and the weight can be increased.

When passing through a route element (road), the history storage processing unit 88 sets the weight to 0.5 if the route element is less than 100 m. The history storage processing unit 88 sets the weight to 1 if the route element is 100 m or more and less than 500 m and sets the weight to 1.5 if the route element is 500 m or more. This is because the user easily remembers the route element if the road as the route element is long.

When passing through a route element, the history storage processing unit 88 sets the weight to 3 if a landmark (for example, a commercial facility such as a department store, a railroad station, a tower, and a bridge) that is likely to be left in mind is near the route element and sets the weight to 1 if there is no such a landmark. This is because the user can easily remember the route element with a landmark.

The memory cost determination unit 84 determines the memory cost in the same way as in the embodiment. In this case, for example, the memory cost determination unit 84 calculates the rate of the passage through the route element based on the weights. For example, if the history of a route element includes a history of weight 2 and a history of weight 1 in ten actions, the rate of the passage through the route element in ten actions is (2+1)/10=30%.

If the weight is provided to the history as in the modified example, the memory cost determination unit 84 may determine the memory cost without taking the date/time into account, instead of determining the memory cost by taking the date/time into account as in the embodiment. According to the modified example, the memory cost indicative of how less likely the user still has in mind the route element can be determined without taking the date/time in the history into account.

The weight may be provided based on part of whether the passage is in accordance with the route guide by the navigation unit, the length of the route element (road), and the presence or absence of the landmark. The weight may also be provided according to other factors.

The navigation apparatus 100 may be mounted on a vehicle or may be portable.

According to the present invention, the memory cost indicative of how less likely the user still has in mind the route element is determined based on the stored history. Therefore, the present invention has an excellent advantage that the route element familiar to the user can be more accurately figured out compared to a case where the memory cost is simply determined in accordance with the number of passages through the route element. The present invention is useful as a navigation apparatus or the like that stores a history of route elements passed in the past.

What is claimed is:

1. A navigation apparatus comprising:
   a passage history storage unit that stores a history of route elements passed in the past and a user ID of a user who passed each route element in the history of route elements;
   a memory cost determination unit that determines memory costs indicative of how less likely the user still has in mind the route elements stored in the passage history storage unit based on the history stored in the passage history storage unit;
   a route search unit that searches for a route leading to a destination by combining the route elements to minimize a route cost of the entire route including the memory costs determined by the memory cost determination unit; and a navigation unit that performs a route guide in accordance with the route searched by the route search unit,
wherein the determined memory costs are associated with the user ID,
wherein a weight is provided to the history of the route elements stored in the passage history storage unit, and the memory cost determination unit takes the weight into account to determine the memory cost, and
wherein the weight is provided based on presence or absence of a landmark near the route element.

2. The navigation apparatus according to claim 1, wherein the navigation unit performs the route guide in different guide levels based on the memory costs of the route elements included in the route searched by the route search unit.

3. The navigation apparatus according to claim 1, further comprising
a memory cost storage unit that stores the memory costs of the route elements stored in the passage history storage unit, the memory costs determined by the memory cost determination unit,
wherein the route search unit refers to the memory costs stored in the memory cost storage unit to calculate the route cost for the route elements included in a plurality of possible routes to the destination.

4. The navigation apparatus according to claim 1, wherein the history of the route elements stored in the passage history storage unit includes information of date, and the memory cost determination unit takes the information of date into account to determine the memory costs.

5. The navigation apparatus according to claim 4, wherein the memory cost is determined based on a rate of passage through the route element in a most recent certain number of actions.

6. The navigation apparatus according to claim 4, wherein the memory cost is determined based on the number of actions after a last passage through the route element.

7. The navigation apparatus according to claim 4, wherein the memory cost is determined based on a rate of passage through the route element in actions in a most recent certain period.

8. The navigation apparatus according to claim 4, wherein the memory cost is determined based on a period to the last passage through the route element.

9. The navigation apparatus according to claim 4, wherein the memory cost is determined based on at least one of the rate of passage through the route element in a most recent certain number of actions, the rate of passage through the route element in actions in a most recent certain period, the number of actions after the last passage through the route element, and the period to the last passage through the route element.

10. The navigation apparatus according to claim 1, wherein the weight is provided according to whether the route element is based on the passage that follows the route guide by the navigation unit.

11. The navigation apparatus according to claim 1, wherein the weight is provided based on a length of the route element.

12. A navigation apparatus comprising:
a passage history storage unit that stores a history of route elements passed in the past and a user ID of a user who passed each route element in the history of route elements;
a memory cost determination unit that determines memory costs indicative of how less likely the user still has in mind the route elements stored in the passage history storage unit based on the history stored in the passage history storage unit;
a route search unit that searches for a route leading to a destination; and
a navigation unit that performs a route guide in accordance with the route searched by the route search unit, wherein the navigation unit performs the route guide in different guide levels based on the memory costs of the route elements included in the route searched by the route search unit,
wherein the determined memory costs are associated with the user ID,
wherein a weight is provided to the history of the route elements stored in the passage history storage unit, and the memory cost determination unit takes the weight into account to determine the memory cost, and
wherein the weight is provided based on presence or absence of a landmark near the route element.

13. A navigation method comprising:
a passage history storage step of storing a history of route elements passed in the past and a user ID of a user who passed each route element in the history of route elements;
a memory cost determination step of determining memory costs indicative of how less likely the user still has in mind the route elements stored in the passage history storage step based on the history stored in the passage history storage step;
a route search step of searching for a route leading to a destination by selecting the route elements to minimize a route cost of the entire route including the memory costs determined in the memory cost determination step; and
a navigation step of performing a route guide in accordance with the route searched in the route search step,
wherein the determined memory costs are associated with the user ID,
wherein a weight is provided to the history of the route elements stored in the passage history storage unit, and the memory cost determination unit takes the weight into account to determine the memory cost, and
wherein the weight is provided based on presence or absence of a landmark near the route element.

14. A navigation method comprising:
a passage history storage step of storing a history of route elements passed in the past and a user ID of a user who passed each route element in the history of route elements;
a memory cost determination step of determining memory costs indicative of how less likely the user still has in mind the route elements stored in the passage history storage step based on the history stored in the passage history storage step;
a route search step of searching for a route leading to a destination; and
a navigation step of performing a route guide in accordance with the route searched in the route search step, wherein in the navigation step, the route guide is performed in different guide levels based on the memory costs of the route elements included in the route searched in the route search step,
wherein the determined memory costs are associated with the user ID,
wherein a weight is provided to the history of the route elements stored in the passage history storage unit, and the memory cost determination unit takes the weight into account to determine the memory cost, and
wherein the weight is provided based on presence or absence of a landmark near the route element.

15. A non-transitory computer readable medium having a computer program product causing a computer to execute:
- a passage history storage step of storing a history of route elements passed in the past and a user ID of a user who passed each route element in the history of route elements;
- a memory cost determination step of determining memory costs indicative of how less likely the user still has in mind the route elements stored in the passage history storage step based on the history stored in the passage history storage step;
- a route search step of searching for a route leading to a destination by selecting the route elements to minimize a route cost of the entire route including the memory costs determined in the memory cost determination step; and
- a navigation step of performing a route guide in accordance with the route searched in the route search step,
- wherein the determined memory costs are associated with the user ID,
- wherein a weight is provided to the history of the route elements stored in the passage history storage unit, and the memory cost determination unit takes the weight into account to determine the memory cost, and
- wherein the weight is provided based on presence or absence of a landmark near the route element.

16. A non-transitory computer readable medium having a computer program product causing a computer to execute:
- a passage history storage step of storing a history of route elements passed in the past and a user ID of a user who passed each route element in the history of route elements;
- a memory cost determination step of determining memory costs indicative of how less likely the user still has in mind the route elements stored in the passage history storage step based on the history stored in the passage history storage step;
- a route search step of searching for a route leading to a destination; and
- and a navigation step of performing a route guide in different guide levels in accordance with the route searched in the route search step and based on the memory costs of the route elements included in the route searched in the route search step,
- wherein the determined memory costs are associated with the user ID,
- wherein a weight is provided to the history of the route elements stored in the passage history storage unit, and the memory cost determination unit takes the weight into account to determine the memory cost, and
- wherein the weight is provided based on presence or absence of a landmark near the route element.

* * * * *

UNITED STATES PATENT AND TRADEMARK OFFICE
CERTIFICATE OF CORRECTION

PATENT NO. : 8,909,469 B2  
APPLICATION NO. : 13/430324  
DATED : December 9, 2014  
INVENTOR(S) : Nobuhiro Mizuno et al.

Page 1 of 1

It is certified that error appears in the above-identified patent and that said Letters Patent is hereby corrected as shown below:

On the title page item (73), please insert --Denso IT Laboratory Inc.--

Signed and Sealed this  
Eighth Day of March, 2016

Michelle K. Lee  
*Director of the United States Patent and Trademark Office*